United States Patent
Nakakubo

(10) Patent No.: US 7,309,022 B2
(45) Date of Patent: Dec. 18, 2007

(54) SUBSTANCE SHUTOFF DEVICE AND FUEL CELL

(75) Inventor: Toru Nakakubo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 11/329,028

(22) Filed: Jan. 11, 2006

(65) Prior Publication Data

US 2006/0115697 A1    Jun. 1, 2006

Related U.S. Application Data

(63) Continuation of application No. PCT/JP2005/012167, filed on Jun. 24, 2005.

(30) Foreign Application Priority Data

Jun. 30, 2004    (JP) ............................... 2004-194790

(51) Int. Cl.
G05D 23/02    (2006.01)
G05D 23/12    (2006.01)
F16K 17/14    (2006.01)
F16K 17/40    (2006.01)

(52) U.S. Cl. ............... 236/93 A; 236/93 R; 236/101 R; 137/72; 137/74; 137/75; 137/76

(58) Field of Classification Search ............. 236/93 A, 236/93 R, 101 R; 137/72, 74, 75, 76, 68.12, 137/468
See application file for complete search history.

(56) References Cited

U.S. PATENT DOCUMENTS

| | | | |
|---|---|---|---|
| 4,755,439 A | 7/1988 | Trocciola et al. | 429/22 |
| 5,483,228 A | 1/1996 | Bailey et al. | 340/632 |
| 5,737,086 A | 4/1998 | Gerber et al. | |
| 2003/0027030 A1 | 2/2003 | Kawashima et al. | |
| 2003/0056570 A1 | 3/2003 | Shin et al. | 73/25.05 |

FOREIGN PATENT DOCUMENTS

| | | |
|---|---|---|
| CN | 1400679 A | 3/2003 |
| JP | 4-106877 | 4/1992 |
| JP | 6-154022 | 6/1994 |

(Continued)

OTHER PUBLICATIONS

International Search Report and Written Opinion dated Oct. 11, 2005, Issued In corresponding PCT application No. PCT/JP2005/012167.

Primary Examiner—Chen Wen Jiang
(74) Attorney, Agent, or Firm—Fitzpatrick, Cella, Harper & Scinto

(57) ABSTRACT

There is provided a substance shutoff device for shutting down the communication of at least one of an inflammable substance and an oxidizer when the inflammable substance and the oxidizer are brought into contact with each other to thereby prevent further contact between the inflammable substance and the oxidizer. The substance shutoff device comprises a catalyst portion provided in contact with one of an inflammable substance flow path and an oxidizer flow path; and a shutoff means, which operates by heating through a reaction between the inflammable substance and the oxidizer in the catalyst portion to shut down the communication of at least one of the inflammable substance and the oxidizer. A fuel cell using the inflammable substance shutoff device is also provided.

9 Claims, 7 Drawing Sheets

FOREIGN PATENT DOCUMENTS

| | | |
|---|---|---|
| JP | 7-71634 | 3/1995 |
| JP | 7-312824 | 11/1995 |
| JP | 8-138697 | 5/1996 |
| JP | 8-508571 A | 9/1996 |
| JP | 8-315847 | 11/1996 |
| JP | 11-302001 | 11/1999 |
| JP | 2000-2354 | 1/2000 |
| JP | 2000-46219 | 2/2000 |
| JP | 2001-229942 | 8/2001 |
| JP | 2002-92757 | 3/2002 |
| JP | 2003-269679 | 9/2003 |
| JP | 2004-28749 | 1/2004 |
| WO | WO 95/02180 | 1/1995 |

SUBSTANCE SHUTOFF DEVICE AND FUEL CELL

This application is a continuation of International Application No. PCT/JP2005/012167, filed Jun. 24, 2005, which claims the benefit of Japanese Patent Application No. 2004-194790, filed Jun. 30, 2004.

BACKGROUND OF THE INVENTION

1. Field of the Invention

The present invention relates to a substance shutoff device for shutting down the communication of an inflammable substance or oxidizer, and to a fuel cell provided with means for shutting down the communication of a fuel or oxidizer.

2. Related Background Art

A conventional leak detection/shutoff device for an inflammable gas is constructed with a detection mechanism for detecting a gas leak; a control mechanism for giving an order to shut down the gas based on detection signals; and shutoff means for shutting down the gas. The mechanisms and the means are each driven by receiving energy, such as electricity, supplied from outside of the device.

Meanwhile, an example of an inflammable gas detection mechanism is a device employing a semiconductor device. Another example thereof is a device disclosed in Japanese Patent Application Laid-Open No. 2004-028749, in which heat generated by combustion of an inflammable gas in a catalyst portion is converted into a voltage signal through a thermoelectric conversion effect, which is used as a detection signal. Further, as a gas shutoff means, there is often employed a valve, which opens/closes by using electricity, such as an electromagnetic valve. A method is also employed in which the gas shutoff operates by heat. Examples of the heat operated gas shutoff means include a fuse mechanism disclosed in Japanese Patent Application Laid-Open No. 2000-002354, in which a bearing member loses a bearing power by heat so that a valve member seats on a valve seat, and a device disclosed in Japanese Patent Application Laid-Open No. H07-071634, in which a substance, which has softened to deform or has become a viscous fluid by heat, fills in pores of a heat resistant porous material to close a gas flow path. Japanese Patent Application Laid-Open No. 2000-046219 discloses a pressure regulator provided with a thermal fuse. Further, an example of a device, which uses heat of catalytic combustion to operate shutoff means for a gas flow path, is a catalytic combustion hot air device disclosed in Japanese Patent Application Laid-Open No. H06-154022.

Meanwhile, as disclosed in Japanese Patent Application Laid-Open No. H08-315847, a fuel cell is provided with a fuel detection sensor as a safety measure against a fuel leak. The fuel cell is provided with a shutoff means for shutting down the supply of a fuel to a fuel cell body when the fuel leaks, or a discharge means for discharging the fuel out of a case. Further, examples of fuel detection for a fuel cell that have been attempted include a method involving fuel detection by deterioration in power generation characteristics of a fuel cell, and a method involving mixing of an odorant substance or a detecting substance, such as helium, in a gaseous fuel. In addition, an electromagnetic valve or the like is used for fuel shutoff means.

However, the conventional detection means for an inflammable substance involves conversion of a detection signal into an electrical signal for processing, and thus requires a processing circuit and a power source for driving the processing circuit. Further, the shutoff means employing an electromagnetic valve or the like requires a power source for driving the valve. Further, the shutoff means that operates by heat is mostly used for preventing the heating of a system, and no shutoff means is directly connected to a detection mechanism for a leaking substance. Moreover, those systems each have problems in that have a complicated structure and a large size.

Until now, no fuel cell has utilized heat generation associated with catalytic combustion for the detection of a fuel leak. Further, no fuel cell has utilized heat generation associated with catalytic combustion in a power generation cell of a fuel cell for the detection of a fuel leak. Moreover, no fuel cell has utilized a shutoff means driven by heat for shutting down a leaking substance.

SUMMARY OF THE INVENTION

It is, therefore, an object of the present invention to provide an inflammable substance shutoff device with a simple structure, which is driven without the use of drive energy, such as electricity, to shut down the communication of an inflammable substance or oxidizer.

It is another object of the present invention to provide a fuel cell that can shut down the communication of a fuel or an oxidizer without the use of drive energy, such as electricity.

That is, according to one aspect of the present invention, there is provided a substance shutoff device for shutting down the communication of at least one of an inflammable substance and an oxidizer when the inflammable substance and the oxidizer are brought into contact with each other, thereby preventing the continuation of the contact between the inflammable substance and the oxidizer. The substance shutoff device comprises:

a catalyst portion provided in one of an inflammable substance flow path and an oxidizer flow path; and a shutoff means, which operates by heat generated accompanying a reaction between the inflammable substance and the oxidizer in the catalyst portion to shut down the communication of at least one of the inflammable substance and the oxidizer.

The catalyst portion may be provided in the inflammable substance flow path or the oxidizer flow path, or may be provided in contact with a wall surface of one of the inflammable substance flow path and the oxidizer flow path. Further, the expression "prevent continuation of contact between an inflammable substance and an oxidizer" is intended to encompass not only a case where the contact is immediately cut off (or broken), but also a case where the contact is cut off (or broken) after a certain period of time.

According to another aspect of the present invention, there is provided a fuel cell comprising:

a cell portion comprising a fuel electrode for being supplied with a fuel, an oxidizer electrode for being supplied with an oxidizer, and an ionic conductor provided between the fuel electrode and the oxidizer electrode;

a fuel flow path;

an oxidizer flow path;

a detection means, which generates heat by contact between the oxidizer and the fuel; and a shutoff means provided in at least one of the fuel flow path and the oxidizer flow path and thermally coupled to the detection means, for shutting down the communication of at least one of the fuel and the oxidizer based on the heat generation of the detection means.

DESCRIPTION OF THE PREFERRED EMBODIMENTS

Figure 1:
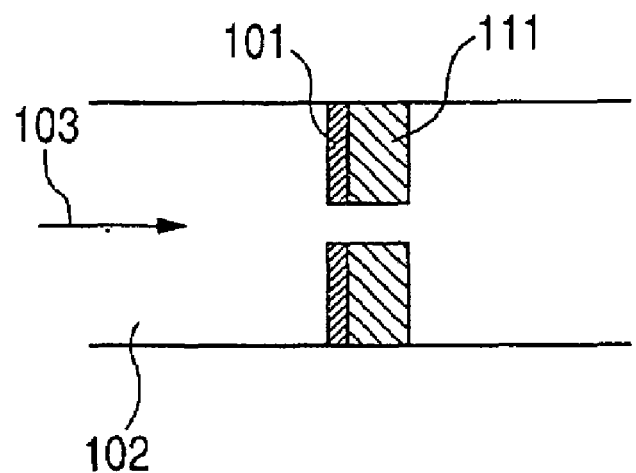
FIG. 1 is a schematic view showing an example of the substance shutoff device in accordance with the present invention.

The inflammable substance shutoff device of the present invention is capable of detecting and shutting down a leak of an inflammable substance and can therefore be utilized, for example, in a fuel cell.

The present invention can provide an inflammable substance shutoff device capable of reducing the use of a drive source such as electricity and shutting down leak of an inflammable substance or oxidizer with a simple construction.

Further, the present invention can provide a small and highly safe fuel cell provided with a means for shutting down a leak of a fuel or oxidizer.

The substance shutoff device of the present invention is for shutting down the communication of at least one of an inflammable substance and an oxidizer when the inflammable substance and the oxidizer are brought into contact with each other, thereby preventing the continuation of the contact between them, and is characterized by having a catalyst portion provided in one of an inflammable substance flow path and an oxidizer flow path and a shutoff means, which operates by heat generated by a reaction between the inflammable substance and the oxidizer in the catalyst portion to shut down the communication of at least one of the inflammable substance and the oxidizer. In other words, the substance shutoff device of the present invention can be described as a substance shut off device for shutting down at least one of an inflammable substance and an oxidizer when the inflammable substance and the oxidizer are brought into contact with each other to thereby prevent (or cut off) the contact, which comprises a catalyst portion provided so as to be brought into contact with one of an inflammable substance and an oxidizer; and a shut off means, which operates by heat generated as a result of a reaction between the inflammable substance and the oxidizer in the catalyst portion to shut down the communication of at least one of the inflammable substance and the oxidizer.

Further, the fuel cell of the present invention is characterized by having a cell portion comprising a fuel electrode for being supplied with a fuel, an oxidizer electrode for being supplied with an oxidizer, and an ionic conductor provided between the fuel electrode and the oxidizer electrode; a fuel flow path; an oxidizer flow path; a detection means, which generates heat by contact between the oxidizer and the fuel; and a shutoff means provided in at least one of the fuel flow path and the oxidizer flow path and thermally coupled to the detection means, for shutting down the communication of at least one of the fuel and the oxidizer based on the heat generation of the detection means.

Incidentally, the term "communication" as herein employed is intended to embrace any action of one of the inflammable substance (or fuel) and the oxidizer coming into contact with the other, including flow or movement.

Further, the term "oxidizer flow path" as herein employed is intended to embrace not only a space enclosed by a wall, such as a rectangular parallelepiped shape, but also an open space, such as the atmosphere (ambient air) existing outside of the substance shutoff device or outside of the fuel cell.

Further, the shutoff means of the present invention operates without the use of electrical signals.

The present invention has been accomplished on the assumption of a system provided with an inflammable substance flow path or a fuel flow path (alternatively, an inflammable substance flow path or a fuel flow path, and an oxidizer flow path), such that the inflammable substance or fuel and the oxidizer are not brought into contact with each other in a normal state.

In the present invention, it is preferred that the shutoff means for the fuel cell shuts down the communication of an inflammable substance.

Further, in the present invention, it is preferred that the shutoff means for the fuel cell shuts down the communication of a fuel.

Hereinafter, preferable embodiments of the shutoff device and fuel cell of the present invention will be enumerated.

It is preferred that the inflammable substance comprise hydrogen.

It is preferred that the oxidizer comprise oxygen.

It is preferred that the catalyst portion comprises platinum.

It is preferred that a heat transfer means be provided between the catalyst portion and the shutoff means.

It is preferred that the shutoff means comprise a material, which softens, becomes a viscous fluid, or foams by heat. Further, it is preferred that this material also be porous.

It is preferred that the shutoff means comprise a member comprising a first material, which softens, becomes a viscous fluid, or foams by heat, and a surface of the member be covered with a second material having a composition different from the composition of the first material.

It is preferred that the shutoff means comprise a bimetal or a shape memory alloy. The term "bimetal" herein employed refers to a material made by bonding together two kinds of thin metal sheets having different coefficients of thermal expansion.

It is preferred that the shutoff means comprise a valve member, which loses bearing power by heat to seat on a valve seat.

It is preferred that the shutoff means comprise a porous member.

Hereinafter, preferable embodiments of the fuel cell of the present invention will be discussed.

It is preferred that the substance shutoff device be provided in a catalyst layer of the fuel cell, and that the shutoff means of the substance shutoff device comprises a material, which softens, becomes a viscous fluid, or foams by heat.

It is preferred that the shutoff means comprise a material having electronic conductivity.

It is preferred that the shutoff means have a fuel cell catalyst on a surface thereof.

It is preferred that the shutoff means comprise a material having ionic conductivity.

EXAMPLES

Example 1

Substance shutoff devices in accordance with the present invention will be described with reference to the accompanying drawings.

The following substance shutoff devices are capable of shutting down the communication of an inflammable substance or oxidizer.

FIG. 1 is a schematic view showing a substance shutoff device in which a material, which softens to deform, or becomes a viscous fluid by heat, is used as a shutoff means.

Figure 2:
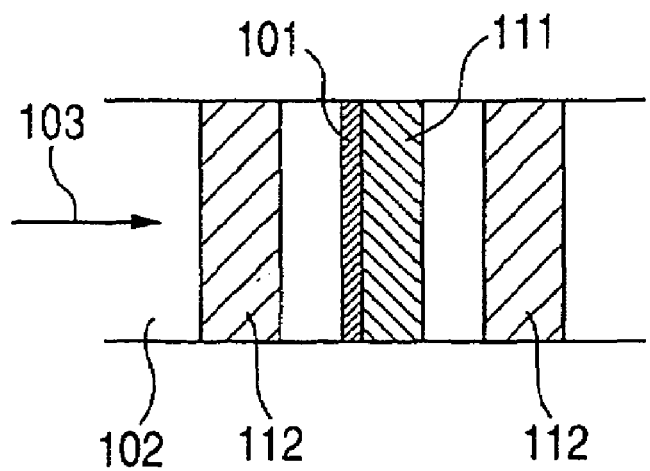
FIG. 2 is a schematic view showing another example of the substance shutoff device in accordance with the present invention.

FIG. 2 is a schematic view showing a substance shutoff device in which a material, which softens to deform or becomes a viscous fluid by heat, is used as a shutoff means, and a heat resistant porous material is provided in the vicinity thereof.

Figure 3:
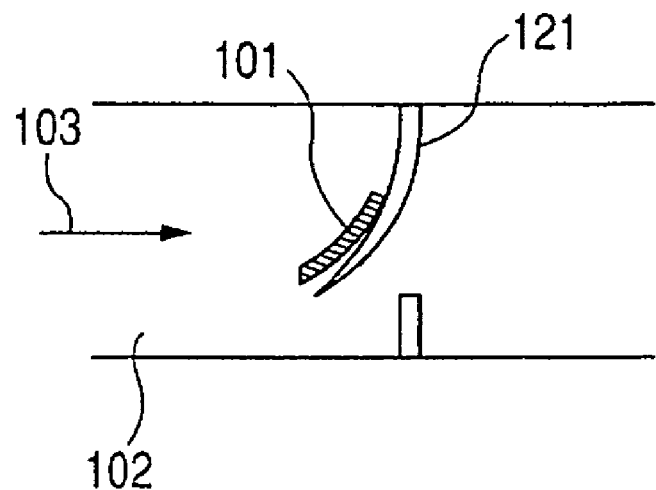
FIG. 3 is a schematic view showing still another example of the substance shutoff device in accordance with the present invention.

FIG. 3 is a schematic view showing a substance shutoff device in which a member made of a shape memory alloy or a bimetal is used as a shutoff means.

Figure 4:
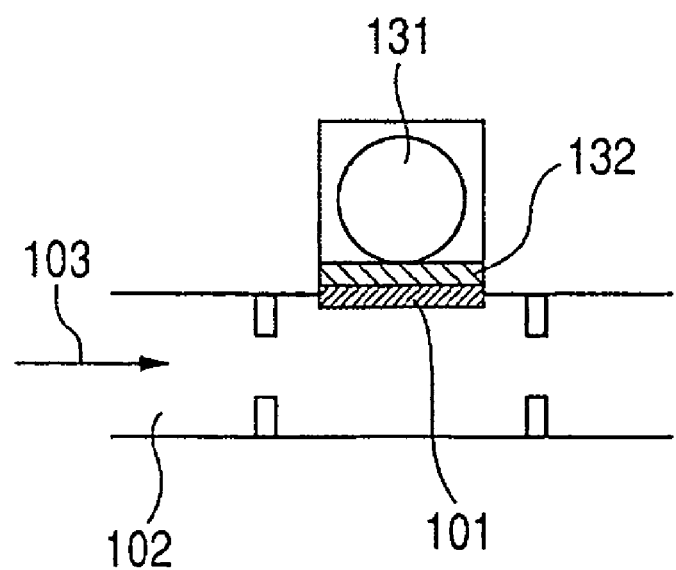
FIG. 4 is a schematic view showing yet another example of the substance shutoff device in accordance with the present invention.

FIG. 4 is a schematic view showing a substance shutoff device in which a valve member, which seats on a valve seat by heat, is used as a shutoff means.

Figure 5:
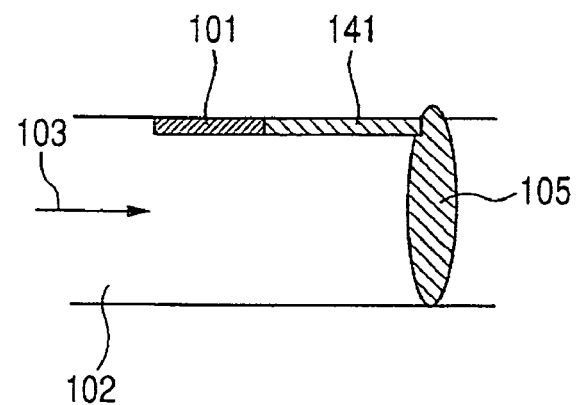
FIG. 5 is a schematic view showing still yet another example of the substance shutoff device in accordance with the present invention.

FIG. 5 is a schematic view showing a substance shutoff device in which a substance detection portion and a shutoff means are provided distant from each other.

The term "inflammable substance" herein employed refers to an inflammable gas, such as hydrogen or hydrocarbon, and an inflammable liquid, such as methanol or ether.

Further, examples of the oxidizer include oxygen-containing substances, such as air and oxygen.

In the present example, a case is described where an inflammable gas (hydrogen) is used as the inflammable substance and air is used as the oxidizer. However, the present invention is not limited to the use of hydrogen and air.

In a case where a catalyst portion for leak detection is provided in an inflammable substance flow path of the substance shutoff device of the present invention, air diffusing and entering through a leak portion of the inflammable gas is mixed with the inflammable gas, thereby causing a catalytic combustion reaction in the catalyst portion. Alternatively, in a case where a catalyst portion for leak detection is provided outside of the inflammable substance flow path of the substance shutoff device of the present invention, the leaked inflammable gas is mixed with air, thereby causing a catalytic combustion reaction in the catalyst portion. Platinum may be used as a catalyst. In a case where a gas that is used contains a substance that damages platinum, such as carbon monoxide, a catalyst comprising ruthenium is effectively used. When a catalytic combustion reaction takes place, the catalyst portion generates heat. The heat generation causes the shutoff means (means for shutting down communication of a gas in this example, which is hereinafter referred to as "gas shutoff means") to operate.

Examples of the gas shutoff means include the following.

First, as shown in FIG. 1, in a state where a gas flow 103 of an inflammable substance or oxidizer is ensured in a flow path 102, a material 111, which softens to deform or becomes a viscous fluid by heat, is provided at a rear side of and in contact with a catalyst 101 in the flow path 102. Examples of the material that softens to deform or becomes a viscous fluid by heat include low melting point metals and thermoplastic resins. Examples of the low melting point metals include metals, such as tin, indium, selenium, lead, and bismuth, and alloys containing them. Examples of the thermoplastic resins include polyethylene, polypropylene, and polyoctene. Further, a member that foams by heat, such as a mixture of sodium silicate and an epoxy resin, may also be used. In a case where the low melting point metal is used, the low melting point metal may be coated on its surface to prevent corrosion. Examples of the coating material that can be used include carbon, noble metals, such as gold, silver, and platinum, ceramics, and organic materials. In particular, in a case where platinum is used as the coating material, the resulting structure may be used also as a catalyst for leak detection.

As a method of ensuring the gas flow, there may be included a method of forming the material, which softens to deform or becomes a viscous fluid by heat, into a porous member and providing the porous member in the flow path, or a method of partly providing the material which softens to deform or becomes a viscous fluid in the flow path, as shown in FIG. 1. The same applies to the catalyst 101. The material, which softens to deform or becomes a viscous fluid by heat, melts due to heat generated by a catalytic combustion reaction to close the flow path, thereby shutting down the gas.

Secondly, when a heat resistant porous material 112 is provided adjacent to a material 111, which softens to deform or becomes a viscous fluid by heat, as shown in FIG. 2, the material 111 can soften to deform or become a viscous fluid by heat to fill in the pores of the porous material 112, thereby shutting down the gas. In this case, the method of ensuring gas flow described above for the configuration shown in FIG. 1 can also be adopted. Further, the material, which softens to deform or becomes a viscous fluid by heat, may be subjected to a surface coating to thereby impart conductivity or electrical insulating property to the surface, or to control the wettability of the surface.

Moreover, as shown in FIG. 3, another gas shutoff means may be employed in which a stop valve 121 using a shape memory alloy or a bimetal is provided in contact with a catalyst 101. The stop valve 121 has a mechanism such that it is normally open, but closes by heat generated by a catalytic combustion reaction to close the flow path, thereby shutting down the gas.

Moreover, as shown in FIG. 4, another method of shutting down the communication of a gas may be employed in which a valve member 131 is provided and a bearing portion 132 for bearing the valve member 131 is further provided in contact with a catalyst 101, and the bearing portion 132 deforms by heat generated by a catalytic combustion reaction at the catalyst 101. Thus, the valve member 131 enters into the flow path 102 and is forced by the gas flow to sit on the valve seat having a hole at the central portion provided in the flow path 102, thereby shutting down the gas. A bimetal, a shape memory alloy, a material that softens to deform or becomes a viscous fluid by heat, or the like, may be used for the bearing portion.

Further, as shown in FIG. 5, in a case where a gas leak detection portion (where a catalyst 101 is provided) and a gas shutoff portion 15 are provided distant from each other, the catalyst 101 and the gas shutoff portion 15 are connected via a material 141 having a high thermal conductivity. Thus, heat of a catalyst reaction at the catalyst 101 can efficiently be transferred to the gas shutoff portion 15. The material having a high thermal conductivity preferably has a high melting point, and examples thereof include metals, such as gold, silver, copper, stainless steel, and aluminum, alumina, silicon, and thermally conductive polymers.

By adopting the above-described construction, when an inflammable gas leaks, the gas shutoff means can be operated by using the heat of a catalyst reaction to shut down the gas leakage.

Example 2

Description is made of the case where the shutoff means of the present invention is provided in a fuel flow path or oxidizer flow path of a fuel cell.

Figure 6:
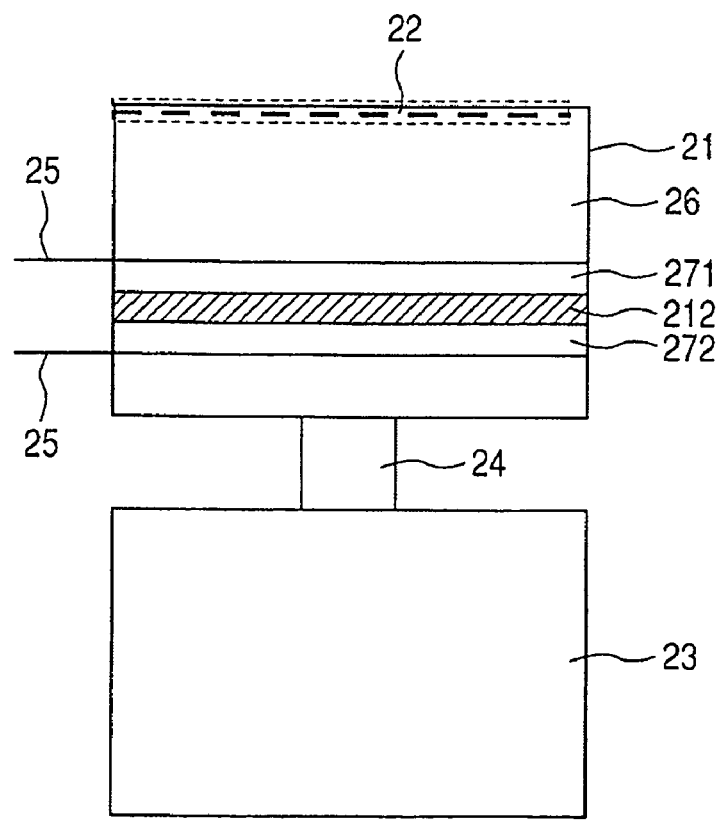
FIG. 6 is a schematic view showing an example of the fuel cell in accordance with the present invention.
Figure 7:
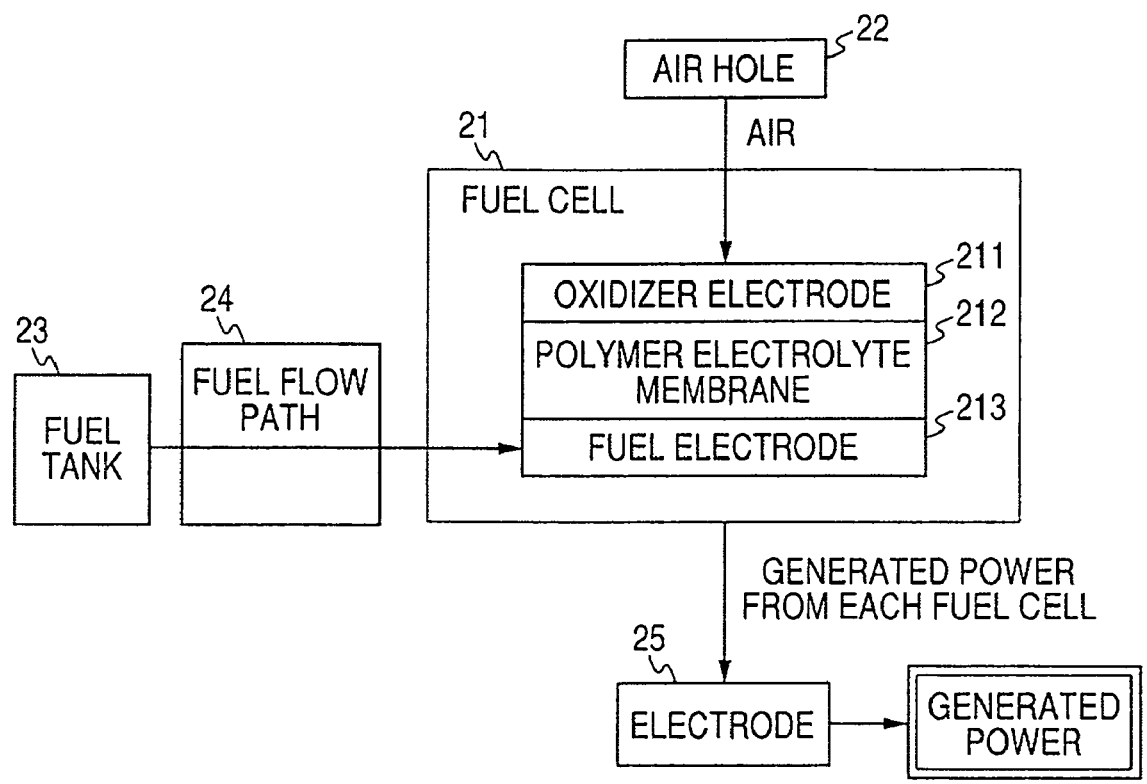
FIG. 7 is a schematic diagram showing an example of a fuel cell system in accordance with the present invention.

First, a construction of a fuel cell is described by taking a polymer electrolyte fuel cell as an example. FIG. 6 is a schematic view of the fuel cell, and FIG. 7 is a schematic diagram of a fuel cell system. Next, a power generation process of the fuel cell will be described. A fuel stored in a fuel tank 23 is supplied to a fuel electrode (anode) 213 through a fuel flow path 24. As the fuel, there is generally used an inflammable gas, such as hydrogen or hydrocarbon, or a liquid fuel, such as methanol or ether. Meanwhile, an oxidizer is supplied to an oxidizer electrode (cathode) 211. The oxidizer is generally air, oxygen, or the like. In particular, when ambient air is used as the oxidizer, it is supplied through air holes 22. An oxidizer may be supplied from a tank holding the oxidizer instead of from ambient air.

Hereinafter, the description is made of the case where hydrogen is used as the fuel, and air is used as the oxidizer. However, the present invention is not limited to the use of hydrogen and air.

The fuel and the oxidizer pass through diffusion layer 271 and 272, respectively, and the fuel reacts at a catalyst provided in the fuel electrode 213 while the oxidizer reacts at a catalyst provided in the oxidizer electrode 211. During the reaction, ions pass through a (polymer) electrolyte membrane 212, and electrons are guided to the electrode 25 and are taken out as electricity. In the reactions, the fuel and the oxidizer generally do not mix and undergo reactions at the respective electrodes. However, if the electrolyte membrane breaks to cause fuel leak, the fuel and the oxidizer may cause a catalytic combustion reaction on the catalyst. Further, other components may break to cause a leak of the fuel to the outside. The fuel cell generates heat during power generation, and generally reaches a temperature of about 40 to 80° C. in room-temperature environment. Meanwhile, heat generation caused by mixing of the fuel and the oxidizer for catalytic combustion may raise the temperature of the fuel cell to above 100° C., depending on the mixing ratio of the fuel and the oxidizer.

In the present example, the substance shutoff means described in Example 1 is provided in at least one of a fuel flow path and an oxidizer flow path. Further, the substance shutoff means may be disposed at a valve or the like provided in a flow path, thus enabling the valve to be closed to thereby shut down the gas. As the detection means for detecting a fuel leak, a member may be employed, which generates heat by a contact between the oxidizer and the fuel. For example, a catalyst portion, which generates heat upon the reaction between the oxidizer and the fuel, may be used. In a case where the catalyst portion is used as the detection means, a catalyst layer of a fuel cell may be used as the catalyst portion, or another catalyst portion may be provided separately from the catalyst layer of the fuel cell. The detection means and the shutoff means are thermally bonded by bringing the detection means and the shutoff means into contact with each other, or using a heat transfer means, which connects the detection means and the shutoff means. In a case where the catalyst portion for leak detection and the gas shutoff portion as the shutoff means are provided distant from each other, the catalyst portion and the gas shutoff portion are preferably connected through a member having a high thermal conductivity. When the fuel leaks, a mixture of the fuel and the oxidizer are brought into contact with a catalyst portion for leak detection to thereby cause a catalytic combustion reaction. The gas shutoff means operates by heat generation associated with the catalytic combustion reaction, thereby shutting down the fuel.

In a case where the shutoff means is provided in a fuel flow path, if the catalyst portion is provided outside of the fuel flow path, the shutoff means operates based on heat generation of the catalyst portion by a reaction between the fuel leaked to the outside of the fuel flow path and the oxidizer to thereby shut down the communication of the fuel. Alternatively, if the catalyst portion is provided in the fuel flow path, the shutoff means operates based on heat generation of the catalyst portion by a reaction between the fuel and the oxidizer entering into the fuel flow path to thereby shut down the communication of the fuel. In this way, a continued fuel leak to the outside of the fuel flow path can be prevented.

Meanwhile, in a case where the shutoff means is provided in an oxidizer flow path, when fuel leaks from the fuel flow path and enters into the oxidizer flow path, the shutoff means operates based on heat generation of the catalyst portion by a reaction between the leaked fuel and the oxidizer to thereby shut down the communication of the oxidizer. In this way, the oxidizer flow path is shut down to thereby prevent continuation of inflow of the fuel into the oxidizer flow path.

Further, there are sometimes cases where in order to improve power generation characteristics of a fuel cell, an oxidizer gas is partly mixed into a fuel gas to operate the fuel cell. However, because the heat of catalytic combustion generated by the fuel leak causes an operation at higher temperatures than that during a normal operation, an operation involving fuel leak and a normal operation can be detected distinguishably, so that the present invention is effective in this case as well.

Example 3

Description is made of the case where an inflammable substance shutoff device of the present invention is provided in a diffusion layer of a fuel cell.

Figure 8:
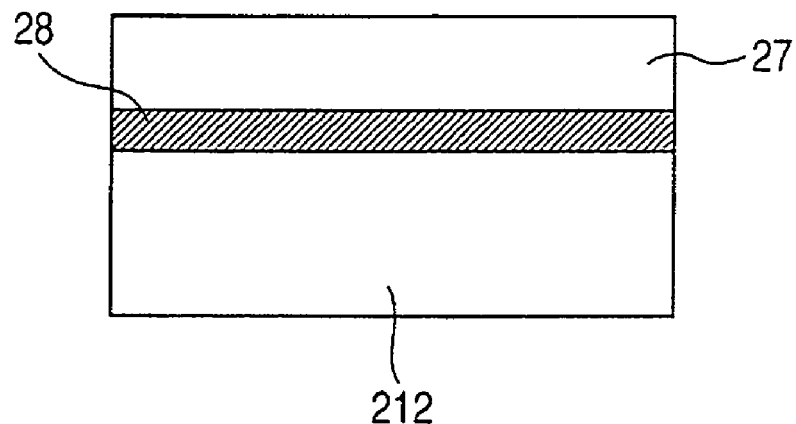
FIG. 8 is a sectional view showing a diffusion layer of a fuel cell.

As shown in FIG. 8, a fuel cell generally has a diffusion layer 27 outside of a catalyst layer 28. First, a diffusion electrode layer exists in contact with a catalyst. A carbon porous member is preferably used as the diffusion electrode layer. Further, a current collecting layer having diffusibility or an electrical insulating layer having diffusibility for effecting electrical insulation may additionally be provided outside the diffusion electrode layer. For the diffusion collecting layer, a metal foam, processed metal or processed carbon may be used, while for the diffusion electrical insulating layer, a plastic material may be used.

Figure 9:
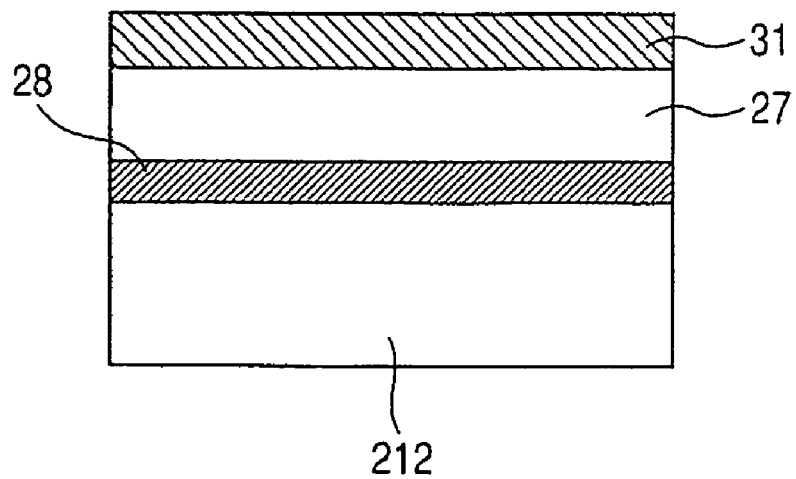
FIG. 9 is a sectional view showing a diffusion layer of a fuel cell provided with a shutoff means in accordance with the present invention.
Figure 10:
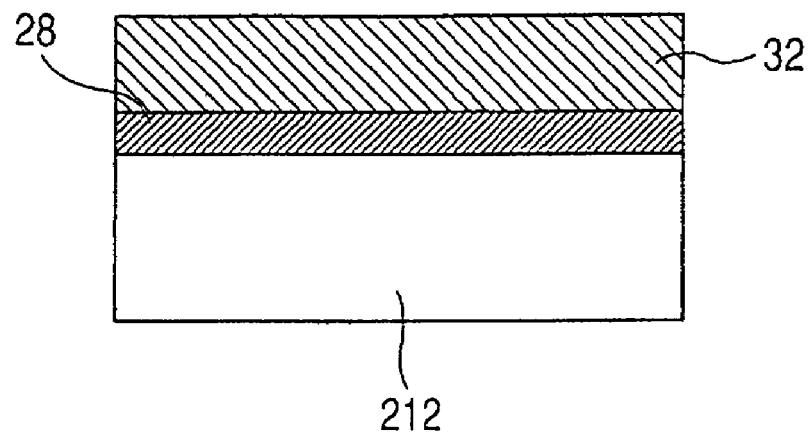
FIG. 10 is a sectional view showing a diffusion layer of a fuel cell provided with a shutoff means having diffusibility in accordance with the present invention.

In the present example, as shown in FIG. 9, a member 31 made of a material that softens to deform or becomes a viscous fluid by heat is further provided outside the diffusion layers. Alternatively, as shown in FIG. 10, a diffusion layer 32 made of a porous material that softens to deform or becomes a viscous fluid by heat may be used as a conductive or electrical insulating member having diffusibility. Examples of the conductive material include metals, such as tin, indium, selenium, lead, and bismuth, and alloys containing them. A material prepared by mixing a conductive substance into a thermoplastic resin may also be used. These low melting point metals may be subjected to surface coating for protecting the metal from corrosion. Meanwhile, examples of the electrically insulating material include compounds, such as polyethylene, polypropylene, and polyoctene. A member that foams by heat, such as a mixture of sodium silicate and an epoxy resin, may also be used.

The surface of the material that softens to deform or becomes a viscous fluid by heat may be coated to become electrically conducting or insulating. Further, the surface coating allows the wettability to be controlled. As a catalyst for detecting a gas leak, a catalyst layer of a fuel cell may be used, or another catalyst layer may be provided separately from the catalyst layer of the fuel cell. If fuel leakage occurs due to the breakage of an electrolyte membrane or the like, air and the fuel may react at a catalyst portion for detecting fuel leak to thereby cause catalytic combustion. A diffusion member made of the low melting point material melts by heat generation associated with the catalytic combustion to clog the diffusion layer. This results in the shut down of the fuel leak and/or prevention of the contact of a mixed gas of the leaked fuel and ambient air with the fuel cell catalyst.

Example 4

Description is made of the case where an inflammable substance shutoff device of the present invention is provided in a catalyst layer of a fuel cell.

Figure 11:
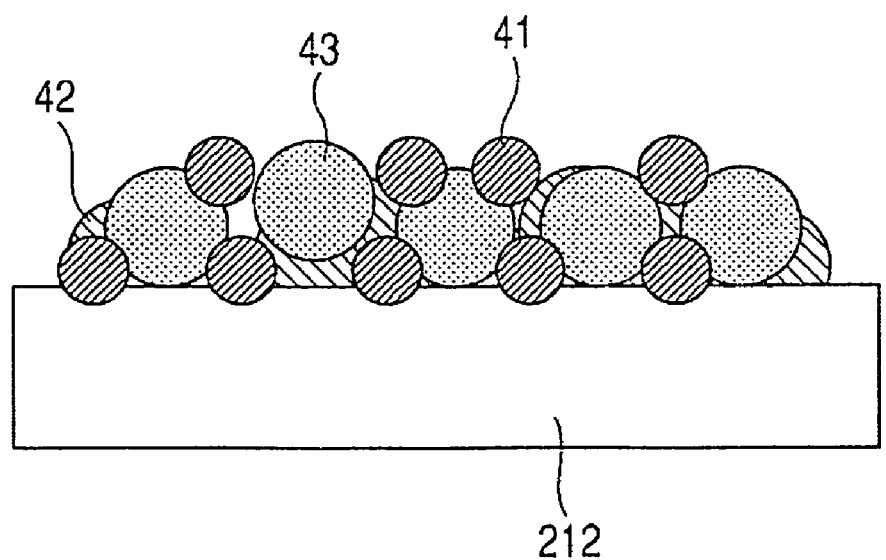
FIG. 11 is a sectional view showing a catalyst layer of a fuel cell.

As shown in FIG. 11, a catalyst layer of a fuel cell generally has a structure in which a catalyst 41 is disposed on an electrolyte membrane 212. The catalyst layer is formed of a porous member or fine particles in order to assure diffusibility of a fuel or oxidizer and is electrically connected to a gas diffusion electrode. Further, the catalyst layer may be mixed with an electrolyte 42 in order to effectively form an ion path, or the catalyst layer may be formed of catalyst fine particles 41 carried on carrier particles 43, such as carbon, in order to improve the utilization efficiency of the catalyst.

In the present example, catalyst fine particles are mixed with a member made of a material that softens to deform or becomes a viscous fluid by heat to thereby form a catalyst layer. If the electrolyte membrane breaks to cause fuel leakage, a catalytic combustion reaction will take place at the fuel cell catalyst. This raises the temperature of the catalyst layer, so that the above member softens or becomes a viscous fluid to cover the catalyst layer. Thus, the catalytic combustion will stop.

The material that softens to deform or becomes a viscous fluid by heat may have at least one of electronic conductivity and ionic conductivity to thereby further improve the catalytic performance. In a case where the material has electronic conductivity, this material can be a metal, such as tin, indium, selenium, lead, or bismuth, or an alloy containing these metals. Further, there may also be used a material prepared by mixing a conductive substance into a thermoplastic resin or a material prepared by coating a surface of a thermoplastic resin with a conductive layer. The material may be coated with a corrosion resistant material to prevent corrosion. Examples of the corrosion resistant material include carbon, noble metals, such as gold, silver, and platinum, ceramics, and organic materials. In particular, in a case where platinum is used as a coating material, the resulting structure may also be used as a catalyst for leak detection.

Figure 12:
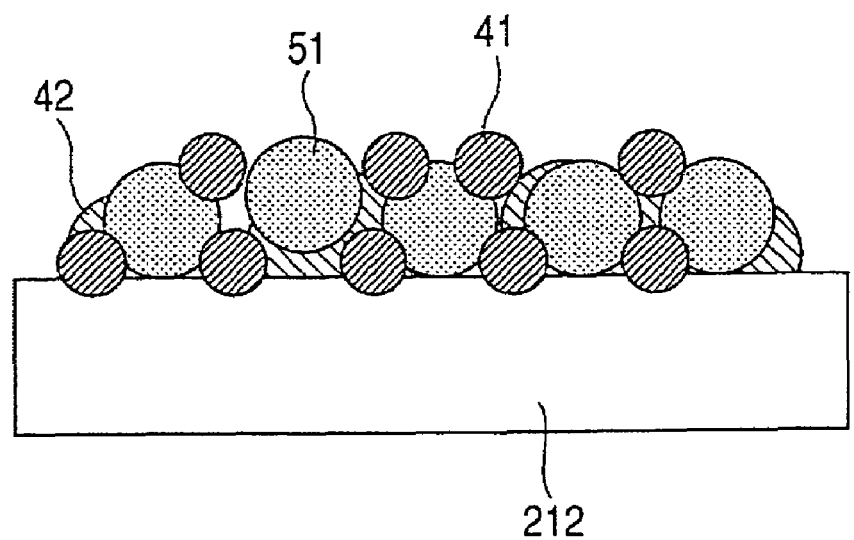
FIG. 12 is a sectional view showing a catalyst layer of a fuel cell provided with a shutoff means having electronic conductivity in accordance with the present invention.
Figure 13:
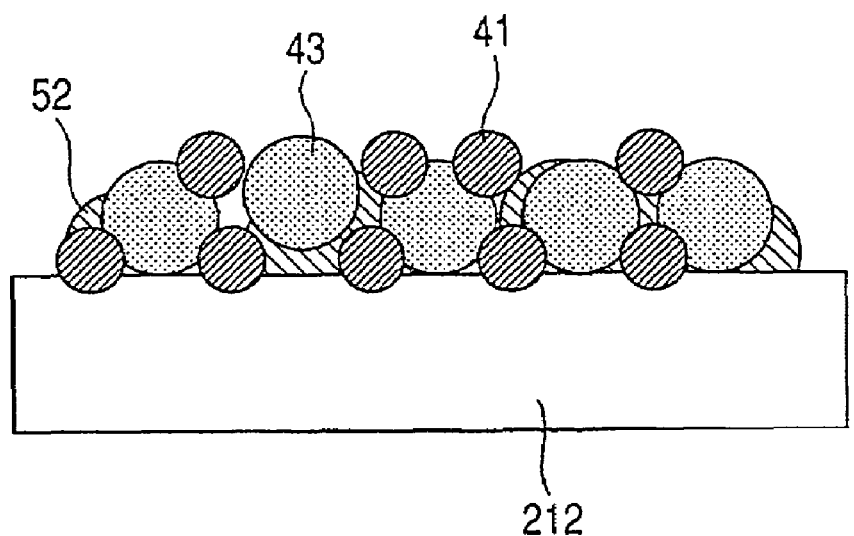
FIG. 13 is a sectional view showing a catalyst layer of a fuel cell provided with a shutoff means having ionic conductivity in accordance with the present invention.

In a case where the material that softens or becomes a viscous fluid by heat has electronic conductivity on the surface as described above, the material may be used as a catalyst carrier 51, as shown in FIG. 12, to thereby improve the catalyst utilization efficiency. Meanwhile, in a case where this material has ionic conductivity, the material may be used as an electrolyte 52, as shown in FIG. 13, to thereby form ion paths between the catalyst 41 and the electrolyte membrane 212. Examples of the material having ionic conductivity include a thermoplastic resin having sulfonic acid groups or phosphoric acid groups introduced therein. The material that softens to deform or becomes a viscous fluid by heat may be subjected to a surface treatment to thereby control the wettability.

This application claims priority from Japanese Patent Application No. 2004-194790, filed Jun. 30, 2004, which is hereby incorporated by reference herein.

What is claimed is:

1. A substance shutoff device for shutting down communication of at least one of an inflammable substance and an oxidizer when the inflammable substance and the oxidizer are brought into contact with each other, thereby preventing continuation of the contact between the inflammable substance and the oxidizer, the substance shutoff device comprising:
   a catalyst portion provided in one of inflammable substance flow path and an oxidizer flow path;
   a shutoff means which operates by heat generated accompanying a reaction between the inflammable substance and the oxidizer in the catalyst portion to shut down communication of at least one of the inflammable substance and the oxidizer; and
   a heat transfer means between the catalyst portion and the shutoff means.

2. The substance shutoff device according to claim 1, wherein the inflammable substance comprises hydrogen.

3. The substance shutoff device according to claim 1, wherein the oxidizer comprises oxygen.

4. The substance shutoff device according to claim 1, wherein the catalyst portion comprises platinum.

5. The substance shutoff device according to claim 1, wherein the shutoff means comprises a material which softens, becomes a viscous fluid, or foams by heat.

6. The substance shutoff device according to claim 5, wherein the material which softens, becomes a viscous fluid, or foams by heat of the shutoff means is a porous member.

7. The substance shutoff device according to claim 5, wherein the shutoff means comprises a member comprising a first material which softens, becomes a viscous fluid, or foams by heat, and wherein a surface of the member is covered with a second material having a composition different from a composition of the first material.

8. The substance shutoff device according to claim 1, wherein the shutoff means comprises a bimetal or a shape memory alloy.

9. The substance shutoff device according to claim 1, wherein the shutoff means comprises a valve member which loses bearing power when subjected to heat to sit on a valve seat.

* * * * *

UNITED STATES PATENT AND TRADEMARK OFFICE
CERTIFICATE OF CORRECTION

| | |
|---|---|
| PATENT NO. | : 7,309,022 B2 |
| APPLICATION NO. | : 11/329028 |
| DATED | : December 18, 2007 |
| INVENTOR(S) | : Toru Nakakubo |

It is certified that error appears in the above-identified patent and that said Letters Patent is hereby corrected as shown below:

ON COVER PAGE AT (56) OTHER PUBLICATIONS

"Issued" should read --issued--.

COLUMN 1

Line 38, "seats" should read --sits--.

COLUMN 2

Line 6, "that" should read --that they--.

COLUMN 4

Line 6, "shut off" should read --shutoff--; and
Line 53, "comprises" should read --comprise--.

COLUMN 5

Line 5, "seat" should read --sit--;
Line 13, "comprises" should read --comprise--; and
Line 43, "seats" should read --sits--.

COLUMN 7

Line 48, "at" should read --as--; and
Line 50, "at" should read --as--.

UNITED STATES PATENT AND TRADEMARK OFFICE
CERTIFICATE OF CORRECTION

PATENT NO.         : 7,309,022 B2
APPLICATION NO.    : 11/329028
DATED              : December 18, 2007
INVENTOR(S)        : Toru Nakakubo It is certified that error appears in the above-identified patent and that said Letters Patent is hereby corrected as shown below:

COLUMN 9

Line 33, "shut down" should read --shutdown--.

Signed and Sealed this

Fifteenth Day of July, 2008

JON W. DUDAS
*Director of the United States Patent and Trademark Office*